No. 871,544. PATENTED NOV. 19, 1907.
J. B. WEBBER, Jr.
DREDGE.
APPLICATION FILED APR. 22, 1907.
2 SHEETS—SHEET 1.
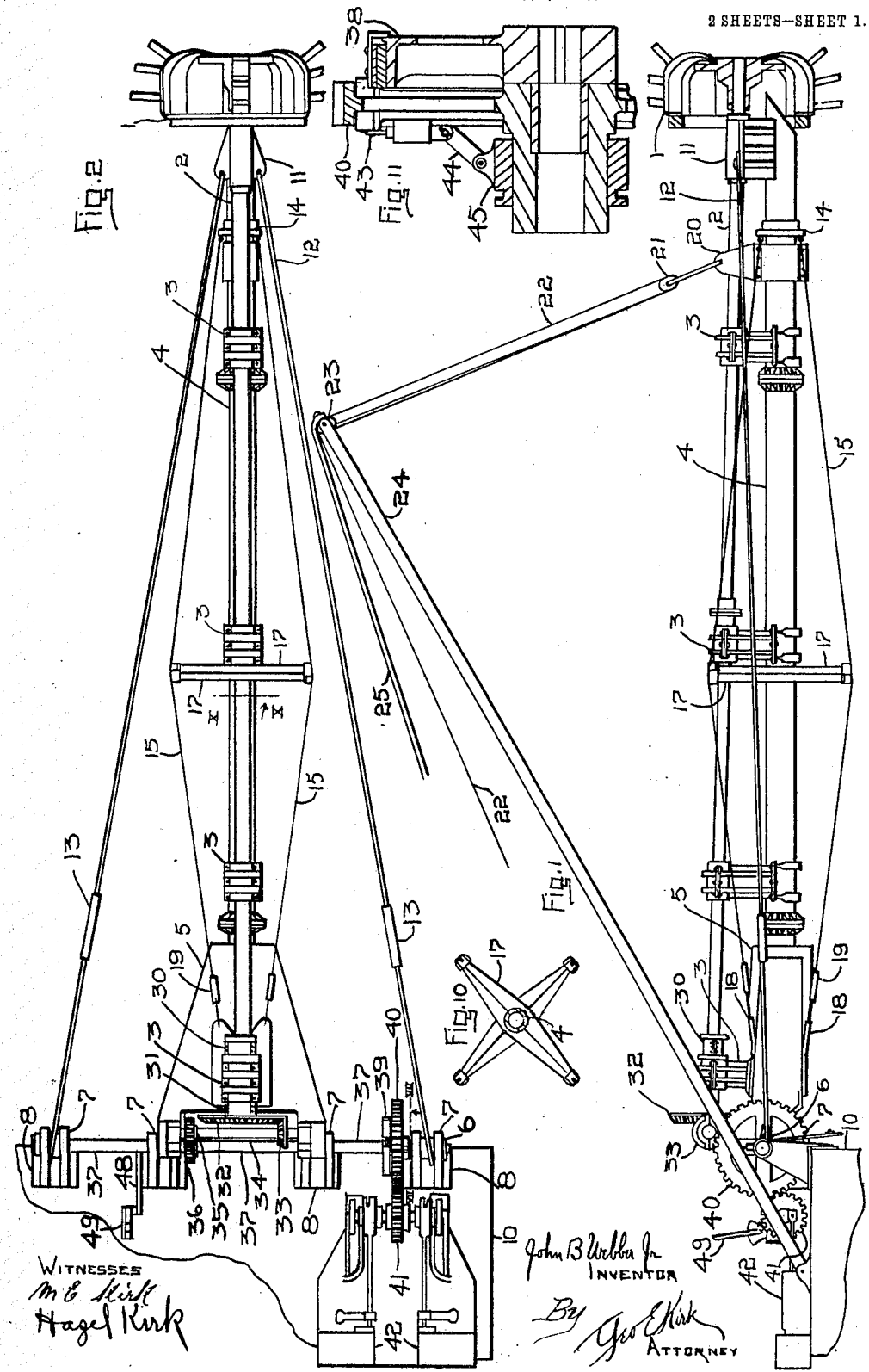

No. 871,544. PATENTED NOV. 19, 1907.
J. B. WEBBER, Jr.
DREDGE.
APPLICATION FILED APR. 22, 1907.
2 SHEETS—SHEET 2.
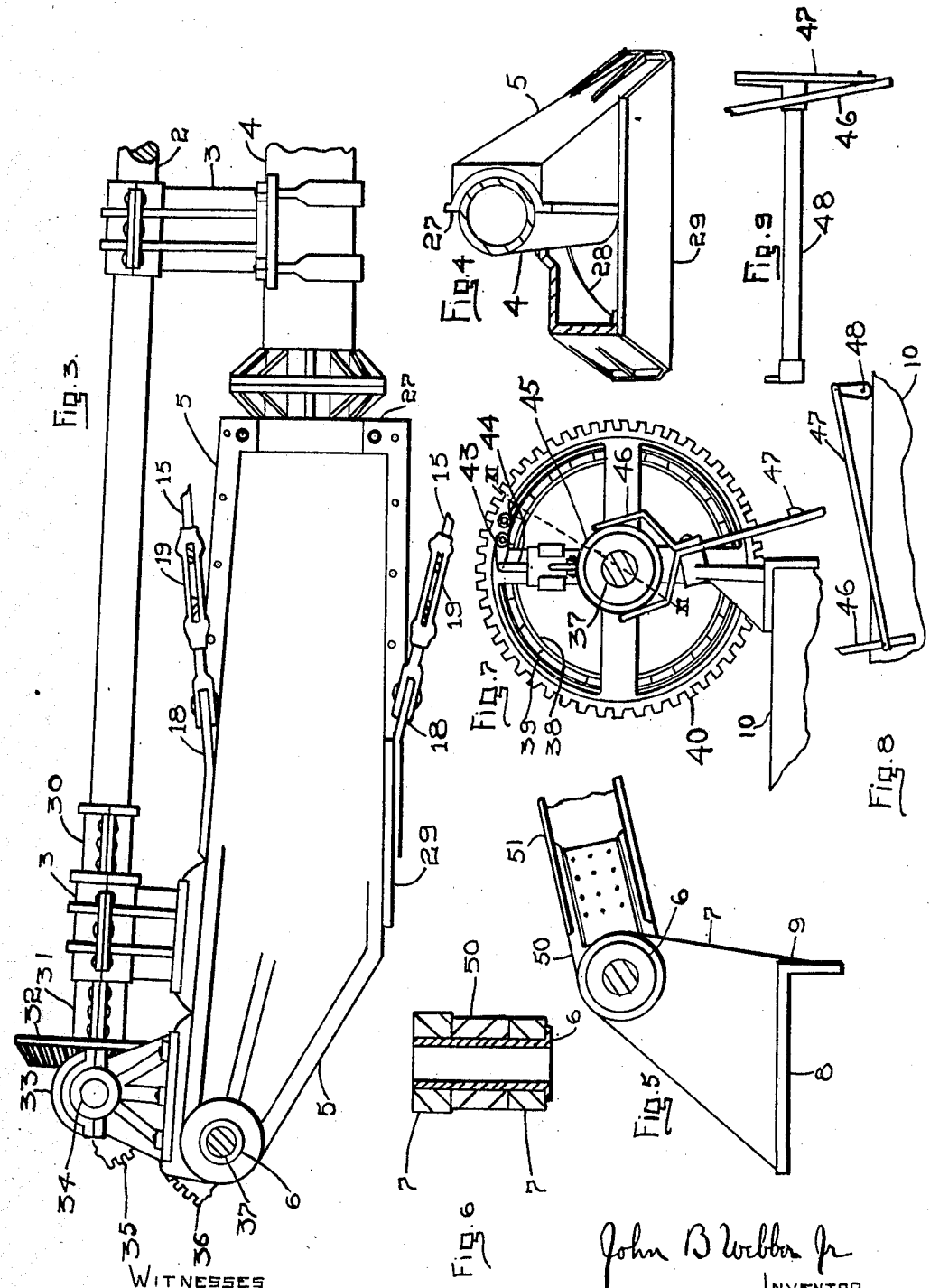

UNITED STATES PATENT OFFICE.

JOHN B. WEBBER, JR., OF TOLEDO, OHIO, ASSIGNOR TO ALEXANDER BACKUS, OF TOLEDO, OHIO.

DREDGE.

No. 871,544.  Specification of Letters Patent.  Patented Nov. 19, 1907.

Application filed April 22, 1907. Serial No. 369,441.

*To all whom it may concern:*

Be it known that I, JOHN B. WEBBER, Jr., a citizen of the United States, residing at Toledo, in the county of Lucas and State of Ohio, have invented a new and useful Dredge, of which the following is a specification.

This invention relates to a rigid pivoted member and the transmission to drive a rotary element carried thereby.

This invention has utility when adapted to excavators, and more particularly to suction dredges having a rotary head.

Referring to the drawings: Figure 1 is a fragmentary side elevation of a rotary head suction dredge showing an embodiment of the invention; Fig. 2 is a plan view thereof with the A-frame and hoisting gearing omitted; Fig. 3 is an enlarged detail of the mounting showing a portion of the suction pipe and shaft mounted thereon; Fig. 4 is a perspective view of the mounting with a portion broken away to show the manner in which the suction pipe is received and clamped therein; Fig. 5 is an elevation of one of the brackets and is shown with a different type of brace member than illustrated in Figs. 1 and 2; Fig. 6 is a section of the double bearing, a feature of each of the brackets for the pipe mounting as well as the braces; Fig. 7 is a section on the line VII—VII Fig. 2, looking in the direction of the arrow, and showing the friction band connector of the engine to the shaft; Fig. 8 is a front elevation of a portion of the linkage to the connector; Fig. 9 is a side elevation of another portion of the manually operated elements for controlling the connector; Fig. 10 is a section on the line X—X Fig. 2, omitting the shaft, showing the truss spreader; and Fig. 11 is a section on line XI—XI Fig. 7 showing longitudinally sliding collar and linkage connection to friction band.

The rotary head, cutter or agitator 1, is fixed to shaft 2 mounted in bearings 3 carried by suction pipe 4. One end of the pipe 4 has an opening adjacent the cutter head, while the remote end of the pipe is carried in pivotal mounting 5.

Brackets 7 afford bearings for the mounting 5. These bearings are sleeves 6 inserted through the eyes of the brackets 7, the portion of the sleeve between the eyes being engaged by the mounting. The bracket 7 has a flat base 8 and at right angles thereto a flange 9 which coact with the top and front sides of the boat or scow 10. These flanges thus engaging the boat are so held as to not work loose.

Mounted on the pipe 4 adjacent the rotary head 1 is a member 11 engaged by braces 12, longitudinally adjustable by means of turn-buckles 13. These braces 12, at their ends remote from member 11, engage between the eyes of brackets 7, and accordingly have bearing on sleeves 6. The brackets 7 for the braces 12 are spaced an equal distance on each side of the pipe 4. As member 11 surrounds the shaft 2, the braces 12 are most effective in causing the remote end of the shaft 2 to be limited in its movements to a plane perpendicular to a line connecting brackets 7.

Carried by pipe 4 is a truss ring 14 engaged by a plurality of trusses 15 which are medially spaced from the pipe 4 by the arms or spreaders 17. These trusses are longitudinally adjustable by means of turn-buckles 19. Remote from the pipe engaging member 14, the trusses 15 are attached to the eyes 18 carried by mounting 5.

Near the agitator 1 is an eye 20 having attached thereto a block 21, through which is threaded the cable 22 of the hoisting gearing, which cable passes through block 23 carried by A-frame 24, which is held in position by the guy 25. This hoisting gearing serves to regulate the depth to which the cutter head is lowered.

The mounting 5 forms a most rigid pivot for the pipe 4. A portion of the mounting is constructed in the form of a clamp 27 to engage securely the pipe 4. The trusses are effective in resisting bending strains, thereby giving the pipe lateral rigidity, while in being carried by the stiff mounting 5, there is no yielding. The mounting is transversely stiffened by web 28 and plate 29.

On the shaft 2, remote from the head 1, is mounted the thrust collar 30, abutting against a bearing 3, on the opposite side of which bearing is a second collar on shaft 2. These collars 30 and 31 serve to keep the shaft 2 in such a fixed longitudinal position as to insure proper meshing of bevel gears 32 and 33. By placing the thrust collars near the mounting and remote from the head, they are not submerged and accordingly not exposed to the grinding of foreign substances to shorten their usefulness period.

Fixed on shaft 2 is bevel gear 32 driven by bevel pinion 33 carried by shaft 34 on the mounting 5. This shaft 34 has fixed thereon gear 35 driven by gear 36 on shaft 37. Shaft 37 extends through the sleeves 6 in the brackets 7, thereby insuring proper alinement of these brackets with resulting accuracy in the mounting and bracing of the pipe and shaft swinging therefrom. Shaft 37 being concentric with the pivots of the mounting 5, insures accurate meshing of gears 36 and 35 at all angles of depth of working of head 1 of the hydraulic dredge.

Fixed to shaft 37 is the wheel 38 having a peripheral friction surface engaged by the friction band 39, whereby the shaft 37 may be connected to or disconnected from continuously driven gear 40 loosely mounted on shaft 37. Gear 40 is driven by gear 41 actuated by the engine 42.

The clutching action of the connector is controlled by rocking of crank shaft 43 through linkage 44 by longitudinally sliding collar 45 on shaft 37. Movement of collar 45 in one direction as to wheel 40, rocks crank shaft 43 to tighten friction band 39 on wheel 38, while movement of the collar in the opposite direction serves to so rock crank shaft 43 as to loosen band 39. This collar is reciprocated by forked lever 46, which by link 47 is connected to rock shaft 48, which rock shaft is operated by a hand lever 49.

In Fig. 5 is shown a form of brace in which a block 50 engages a channel 51, instead of a rod as shown in Figs. 1 and 2.

The hand lever 49 may be so thrown that when head 1 is working in a certain hardness of material, there will be regular transmission, but on getting into more difficult work, the friction may be increased gradually, thereby precluding sudden rack on the machinery with possible disastrous results.

What is claimed and it is desired to secure by Letters Patent is:

1. A hydraulic dredge having a suction pipe, a rotary head, a driving shaft therefor, a pivotal mounting for the shaft and pipe, and a thrust bearing for the shaft adjacent the mounting.

2. A hydraulic dredge comprising a suction pipe, brackets forming a pivotal mounting for the pipe, a rotary head having its axis extending longitudinally of the pipe, and driving means for the head including a shaft extending through the pivotal mounting.

3. A hydraulic dredge comprising a rotary head, a suction pipe having a pivotal mounting, a sleeve engaged by the mounting, and driving means for the head including a shaft mounted in the sleeve.

4. A hydraulic dredge comprising a boat, a plurality of brackets mounted on the boat, a suction pipe, a pivotal mounting for the pipe, and an alining shaft extending through the brackets and the mounting.

5. A hydraulic dredge comprising a rotary head, a continuous driving member, and a manually operated connector to control the transmission to the head.

6. A hydraulic dredge comprising a suction pipe, a clamp mounting engaging the pipe, and means to pivot the mounting.

In testimony whereof I affix my signature in the presence of two witnesses.

JOHN B. WEBBER, Jr.

Witnesses:
 GEO. E. KIRK,
 JOHN N. WEBBER.